J. S. DAVIS.
Corn-Planters.
No. 145,728.  Patented Dec. 23, 1873.
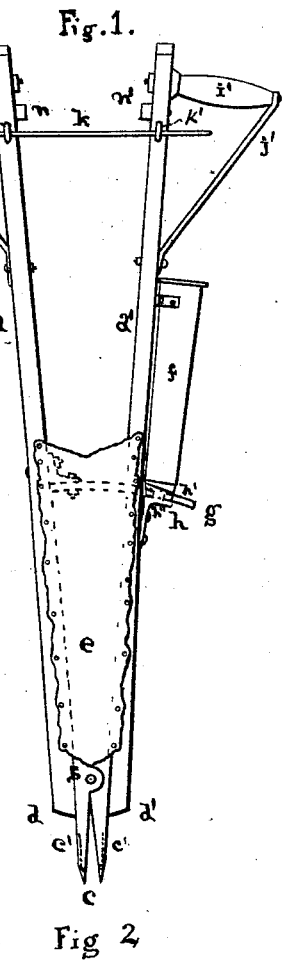
Fig. 1.
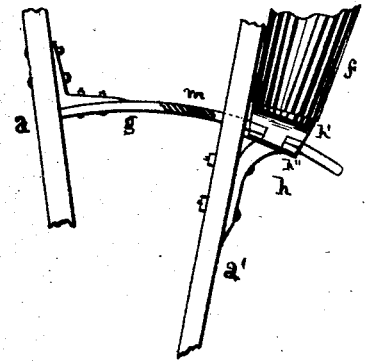
Fig. 3.
Fig. 4.
Fig 2
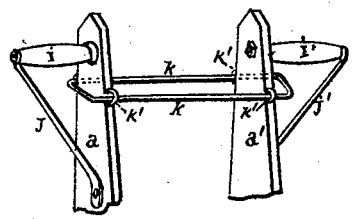
Witnesses:  Jerome S. Davis.
Inventor.

UNITED STATES PATENT OFFICE.

JEROME S. DAVIS, OF ITHACA, NEW YORK.

IMPROVEMENT IN CORN-PLANTERS.

Specification forming part of Letters Patent No. 145,728, dated December 23, 1873; application filed September 12, 1873.

*To all whom it may concern:*

Be it known that I, JEROME S. DAVIS, of the town of Ithaca, Tompkins county, New York, have invented an Improved Corn-Planter, of which the following is a specification:

My invention relates to improvements in that class of planters which are carried in the hands of the operator, and by him thrust in the ground to a depth regulated by a shoulder, which is formed just above the point where its two pivoted arms or handles are separated, and at the same time corn is alternately dropped by the movement of arms or handles and points, as fed from a receptacle carried by one of the handles; and my invention relates to the combination, with a hand planter, constructed as herein described, of a guide or bridle for controlling the motion of the arms or levers, and preventing damage to the apparatus by the too violent operation of such levers.

But that my invention may be fully understood, I will proceed to describe the same in detail by aid of the accompanying drawings.

Figure 1 represents a side view of a hand planter with my improvements applied thereto. Fig. 2 is a perspective view of the upper part of the same; and Figs. 3 and 4 represent detail views of the planter.

$a \, a'$ are two arms or levers, pivoted at $b$, and provided with a point, $c$, constructed in two parts, each part being formed hollow and hinged together at $b$. $d \, d'$ are shoulders formed by the extremities of the levers, which serve to regulate the depth to which the point $c$ shall be thrust into the ground. The arms $a \, a'$ are connected together on each side, as shown, by means of pieces of cloth $e$ or other similar material, thus forming an inclosed space, through which the kernels of corn fall to the hollows in the two sides of the point $c$. $f$ is a reservoir or receptacle for the corn or seed to be planted, and $g$ is a curved slide or gate affixed to the left-hand arm $a$, and provided with an aperture or apertures in it to allow of a given quantity of corn to come down on the plate portion $h''$ of the metallic bottom $h$ of the reservoir. Handles $i$ and $i'$ are affixed to the arms and braced by the rods $j \, j'$. $k$ is a guide or bridle, formed to control the extent of motion of the arms or levers $a \, a'$. This guide or bridle $k$ is arranged to pass through and be held with capability of free movement in eyes or loops $k' \, k'$, carried by the arms or levers $a \, a'$.

In Fig. 3, the side of the feed slide or gate is shown more clearly attached to a part of the arm $a$, and curving through the cast part of the base of the reservoir $f$, which cast metallic part of the base of the reservoir is made of two portions—an upper part joined to the tubular portion of the reservoir, and a lower cast portion, which forms the floor on which the feed slide or gate slides, and a bracing projection below, by which it is made fast to the arm $a'$. By this means the curved slide is moved backward and forward through the arm $a'$ and in the metallic base of the reservoir, and, by the aperture or apertures $m$, in the feed-slide at each opening and closing of the arms $a \, a'$, feeds the desired quantity of kernels of corn to the cavity between the arms made by the cloth and hollow points.

Fig. 4 shows the inside cavity of one side of the double point $c$. The object of this cavity in the opposite sides of the point is, that the kernels of corn may fall to as near the bottom of the point $c$ as is practicable before the thrust into the ground is made. This gives great certainty in planting. The guide or bridle $k$ at the top of the arm is very useful, as it enables the operator to open the arms more violently than if checked only by the hinge $b$ and cloth $e$, and it further aids, by the jar it gives to the apparatus, the certainty of dropping the kernels of corn out of the slide.

The operation of my planter is as follows: The reservoir $f$ being filled with shelled corn, the operator opens the arms until checked by the bridle $k$; this lets the regulated quantity of corn fall into the hollow point $c$. The operator then thrusts the metallic point $c$ into the ground until the shoulders $d \, d'$ strike the ground; he then closes the arms until the blocks $n \, n'$ touch, and thus opens the points, when the kernels will fall into the earth; he then withdraws the implement, and as he opens the arms $a\ a'$ the feed-slide draws the required quantity of seed for the next hill to be planted, and so on as long as desired.

Having thus described my invention, what I claim, and desire to secure by Letters Patent, is—

In a corn-planter, the combination, with the arms or handles $a\ a'$, seed-slide $g$, and recessed points $c'\ c''$, of a guide or bridle, $k$, for limiting the spread of the handles, substantially as shown and described.

JEROME SHEPARD DAVIS.

Witnesses:
S. J. PARKER,
A. M. LUCAS.